US011986971B2

(12) United States Patent
Sugiyama et al.

(10) Patent No.: US 11,986,971 B2
(45) Date of Patent: May 21, 2024

(54) CUTTING DEVICE

(71) Applicant: BROTHER KOGYO KABUSHIKI KAISHA, Nagoya (JP)

(72) Inventors: Kentaro Sugiyama, Gifu (JP); Yoshinori Nakamura, Toyohashi (JP); Tomoyasu Niizeki, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/535,006

(22) Filed: Nov. 24, 2021

(65) Prior Publication Data

US 2022/0080611 A1 Mar. 17, 2022

Related U.S. Application Data

(63) Continuation of application No. 16/580,971, filed on Sep. 24, 2019, now Pat. No. 11,213,966, which is a (Continued)

(30) Foreign Application Priority Data

Mar. 31, 2017 (JP) ................................ 2017-070014

(51) Int. Cl.

*B26D 5/06* (2006.01)
*B26D 5/00* (2006.01)
*B26D 7/26* (2006.01)

(52) U.S. Cl.

CPC ............ *B26D 5/06* (2013.01); *B26D 7/2628* (2013.01); *B26D 2005/002* (2013.01); *B26D 2007/2678* (2013.01)

(58) Field of Classification Search

CPC ........... G05B 2219/45038; B26D 5/00; B26D 5/005; B26D 5/007; B26D 5/02;

(Continued)

(56) References Cited

U.S. PATENT DOCUMENTS 4,524,894 A 6/1985 Leblond
4,825,555 A * 5/1989 Murayama ............ B26D 3/085 33/666

(Continued)

FOREIGN PATENT DOCUMENTS

JP H02-262995 A 10/1990
JP 2002-127092 A 5/2002

(Continued)

OTHER PUBLICATIONS

International Search Report issued in connection with International Application No. PCT/JP2017/033252, dated Oct. 10, 2017. (4 pages).

(Continued)

*Primary Examiner* — Evan H MacFarlane
(74) *Attorney, Agent, or Firm* — K&L Gates LLP

(57) ABSTRACT

A cutting device includes a platen, a mounting portion, a first movement mechanism, a second movement mechanism, a detector, a processor, and a memory. The memory is configured to store computer-readable instructions that, when executed by the processor, instruct the processor to perform processes. The processes include acquiring cutting data, acquiring a contact position output by the detector when the cutting blade comes into contact with the holding member, and controlling the first movement mechanism in accordance with the cutting data to move the mounting portion and the holding member to a cutting start position. The processes include controlling the second movement mechanism, at the cutting start position, to move the mounting portion in the third direction to a cutting position set on the basis of the contact position, and controlling the first movement mechanism in accordance with the acquired cutting data to perform cutting processing.

6 Claims, 11 Drawing Sheets

Related U.S. Application Data continuation of application No. PCT/JP2017/033252, filed on Sep. 14, 2017.

(58) Field of Classification Search

CPC ... B26D 5/06; B26D 5/08; B26D 5/20; B26D 7/26; B26D 7/2628; B26D 7/2635; B26D 7/2642; B26D 7/27; B26D 7/28; B26D 2007/2678; B26F 1/3813; B26F 1/3826; B41J 11/66; B41J 11/663; B41J 11/666; B41J 11/68

See application file for complete search history.

(56) References Cited

U.S. PATENT DOCUMENTS

| | | | | | |
|---|---|---|---|---|---|
| 4,920,495 | A * | 4/1990 | Pilkington | B26F 1/3806 | 83/881 |
| 5,327,353 | A * | 7/1994 | Nagano | B29D 30/46 | 83/72 |
| 5,515,758 | A | 5/1996 | Bechmann | | |
| 5,634,388 | A * | 6/1997 | Fuchigami | B26F 1/3813 | 83/881 |
| 6,152,003 | A | 11/2000 | Jung | | |
| 8,646,366 | B2 | 2/2014 | Workman | | |
| 8,794,117 | B2 | 8/2014 | Downing | | |
| 2005/0186010 | A1 | 8/2005 | Shibata et al. | | |
| 2006/0219070 | A1 * | 10/2006 | Yodokawa | B26D 1/185 | 83/13 |
| 2008/0134851 | A1 * | 6/2008 | Roach | B26D 5/02 | 83/56 |
| 2008/0134857 | A1 * | 6/2008 | Roach | B26D 5/02 | 83/564 |
| 2009/0038451 | A1 * | 2/2009 | Barkai | B26D 5/005 | 83/13 |
| 2012/0038077 | A1 * | 2/2012 | Matsuno | B26D 5/00 | 264/40.5 |
| 2013/0104713 | A1 | 5/2013 | Kawaguchi et al. | | |
| 2014/0150619 | A1 | 6/2014 | Fujihara et al. | | |
| 2016/0026168 | A1 | 1/2016 | Crystal et al. | | |
| 2016/0031109 | A1 | 2/2016 | Abe et al. | | |

FOREIGN PATENT DOCUMENTS

| | | | | |
|---|---|---|---|---|
| JP | 2005-246562 A | | 9/2005 | |
| JP | 2007-136612 A | | 6/2007 | |
| JP | 2008-200783 A | | 9/2008 | |
| JP | 2014-108464 | * | 6/2014 | B26D 7/2614 |

OTHER PUBLICATIONS

International Preliminary Report on Patentability issued in connection with International Application No. PCT/JP2017/033252, dated Oct. 1, 2019. (9 pages).

* cited by examiner

CUTTING DEVICE

CROSS-REFERENCE TO RELATED APPLICATION

This application is a continuation application of U.S. patent application Ser. No. 16/580,971, filed Sep. 24, 2019, which is a continuation application of International Application No. PCT/JP2017/033252, filed Sep. 14, 2017, which claims priority from Japanese Patent Application No. 2017-070014, filed on Mar. 31, 2017. The disclosure of the foregoing application is hereby incorporated by reference in its entirety.

BACKGROUND

The present disclosure relates to a cutting device configured to cut a sheet-shaped cutting object to be cut in accordance with cutting data.

A method is known in which cutting data is generated of a cutting device that cuts a pattern from a cutting object to be cut by moving the sheet-shaped cutting object and a cutting blade relative to each other in accordance with the cutting data. In the cutting device of the related art, a storage device is provided that individually stores various setting conditions that correspond to a classification indicating a hardness, a thickness, and the like of the cutting object, the setting conditions that correspond to the classification of the cutting object are read out from the above-described storage device, and the cutting object is cut on the basis of the read out setting conditions.

SUMMARY

There is a case in which, in the cutting device of the related art, the setting conditions set on the basis of the classification stored in the storage device do not correspond to the actual cutting object. In this case, the cutting device cannot appropriately cut the cutting object.

Various embodiments of the broad principles derived herein provide a cutting device that is capable of cutting a cutting object to be cut using conditions appropriate for the cutting object.

Embodiments provide a cutting device that includes a platen, a mounting portion, a first movement mechanism, a second movement mechanism, a detector, a processor, and a memory. The platen is configured to support a holding member. The holding member is configured to hold a cutting object to be cut. The mounting portion is configured to be mounted with a cutting blade. The first movement mechanism id configured to move the holding member placed on the platen and the mounting portion relative to each other in a first direction and a second direction intersecting the first direction. The second movement mechanism is configured to move the mounting portion in a third direction causing the mounting portion to approach the platen and a fourth direction causing the mounting portion to separate from the platen. The third and fourth directions are directions intersecting the first and second directions. The detector is configured to output a position of the mounting portion in the third direction. The processor is configured to control the first movement mechanism and the second movement mechanism. The memory is configured to store computer-readable instructions that, when executed by the processor, instruct the processor to perform processes. The processes include acquiring cutting data, and controlling the first movement mechanism to move the mounting portion relative to the holding member in the first direction and the second direction to a predetermined position, in a state in which the cutting blade mounted on the mounting portion and the holding member placed on the platen are separated from each other. The processes include controlling the second movement mechanism, at the predetermined position, to cause the mounting portion to approach the platen, and acquiring a contact position. The contact position is a position of the mounting portion in the third direction output by the detector when the cutting blade comes into contact with the holding member. The processes include after controlling the second movement mechanism to cause the cutting blade mounted on the mounting portion and the holding member to be separated, and controlling the first movement mechanism in accordance with the acquired cutting data to move the mounting portion and the holding member relative to each other to a cutting start position at which the mounting portion faces the cutting object held by the holding member. The processes include controlling the second movement mechanism, at the cutting start position, to move the mounting portion in the third direction to a cutting position set on the basis of the acquired contact position, and performing cutting processing to cut the cutting object using the cutting blade mounted on the mounting portion by controlling the first movement mechanism in accordance with the acquired cutting data to move the holding member placed on the platen and the mounting portion relative to each other in the first direction and the second direction.

BRIEF DESCRIPTION OF THE DRAWINGS

Embodiments will be described below in detail with reference to the accompanying drawings in which.

second direction is the cutting start position, and the position of the mounting portion in the up-down direction is a cutting position.

DETAILED DESCRIPTION

An embodiment of the present disclosure will be explained with reference to the drawings. The drawings referred to are used to explain technical features that can be adopted by the present disclosure, and the configuration of devices etc. illustrated therein are not intended to limit the present disclosure thereto, and are simply explanatory examples.

Figure 2:
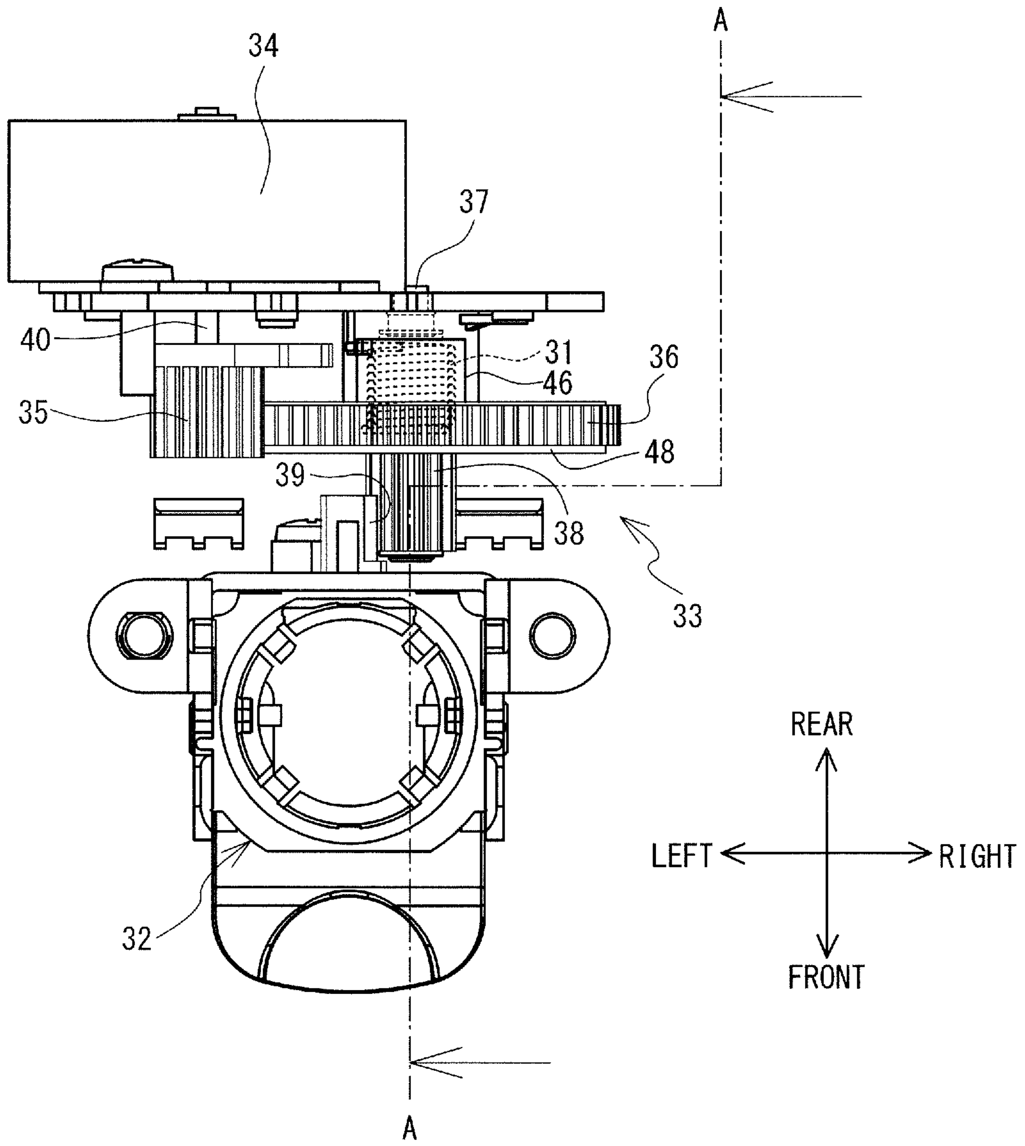
FIG. 2 is a plan view of a mounting portion and an up-down drive mechanism.
Figure 3:
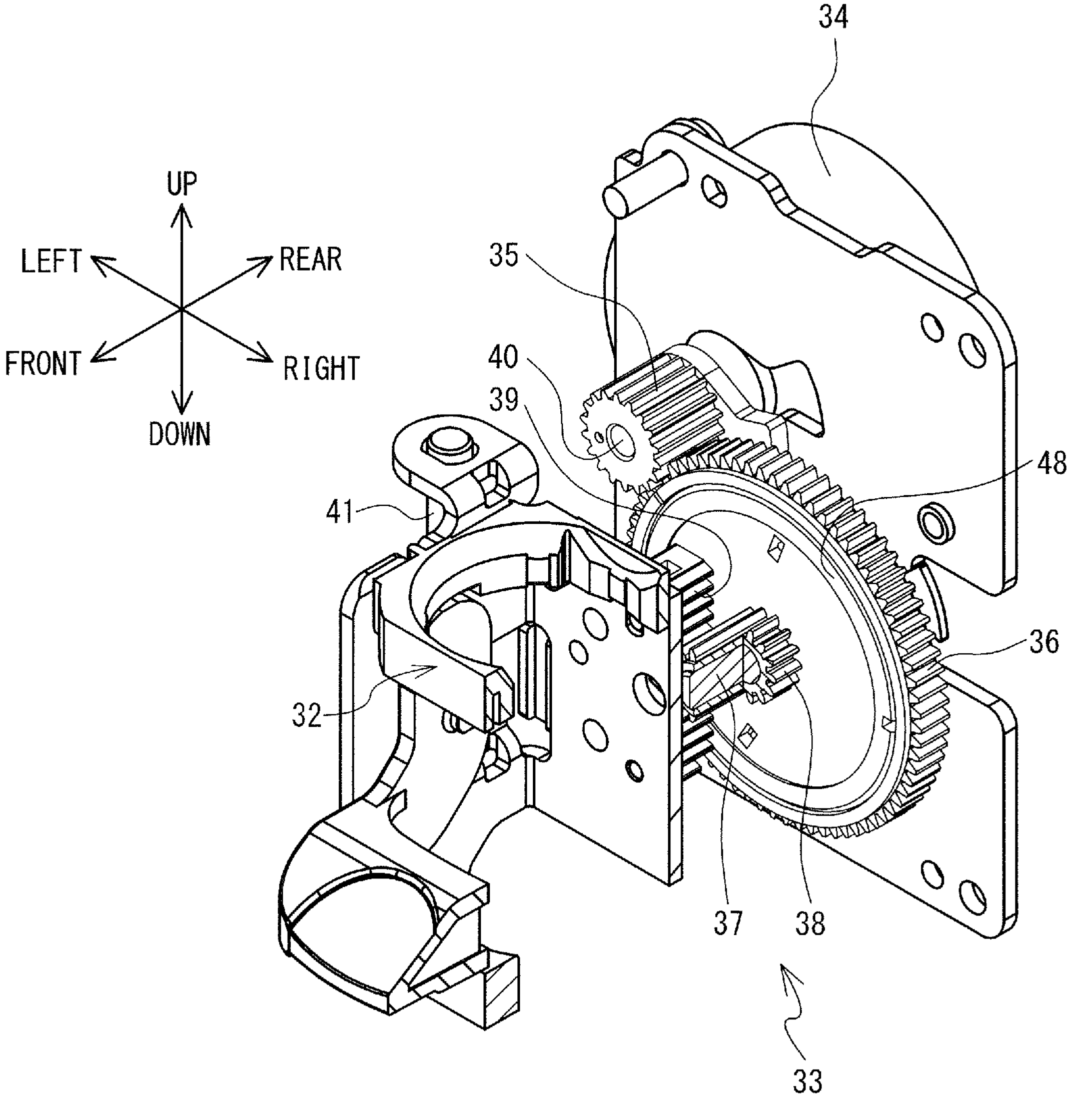
FIG. 3 is a perspective view of the mounting portion and the up-down drive mechanism when cut along a line A-A shown in FIG. 2.

A physical configuration of a cutting device 1 according to the present embodiment will be described with reference to FIG. 1 to FIG. 3. In the following explanation, the lower left side, the upper right side, the lower right side, the upper left side, the upper side, and the lower side respectively define the left side, the right side, the front side, the rear side, the upper side, and the lower side of the cutting device 1. Specifically, an extending direction of a main body cover 9 to be described later is the left-right direction. A surface on which an operation portion 50 is arranged is a top surface of the cutting device 1. The front-rear direction, the left-right direction, the downward direction and the upward direction are also referred to as a first direction, a second direction, a third direction, and a fourth direction.

Figure 1:
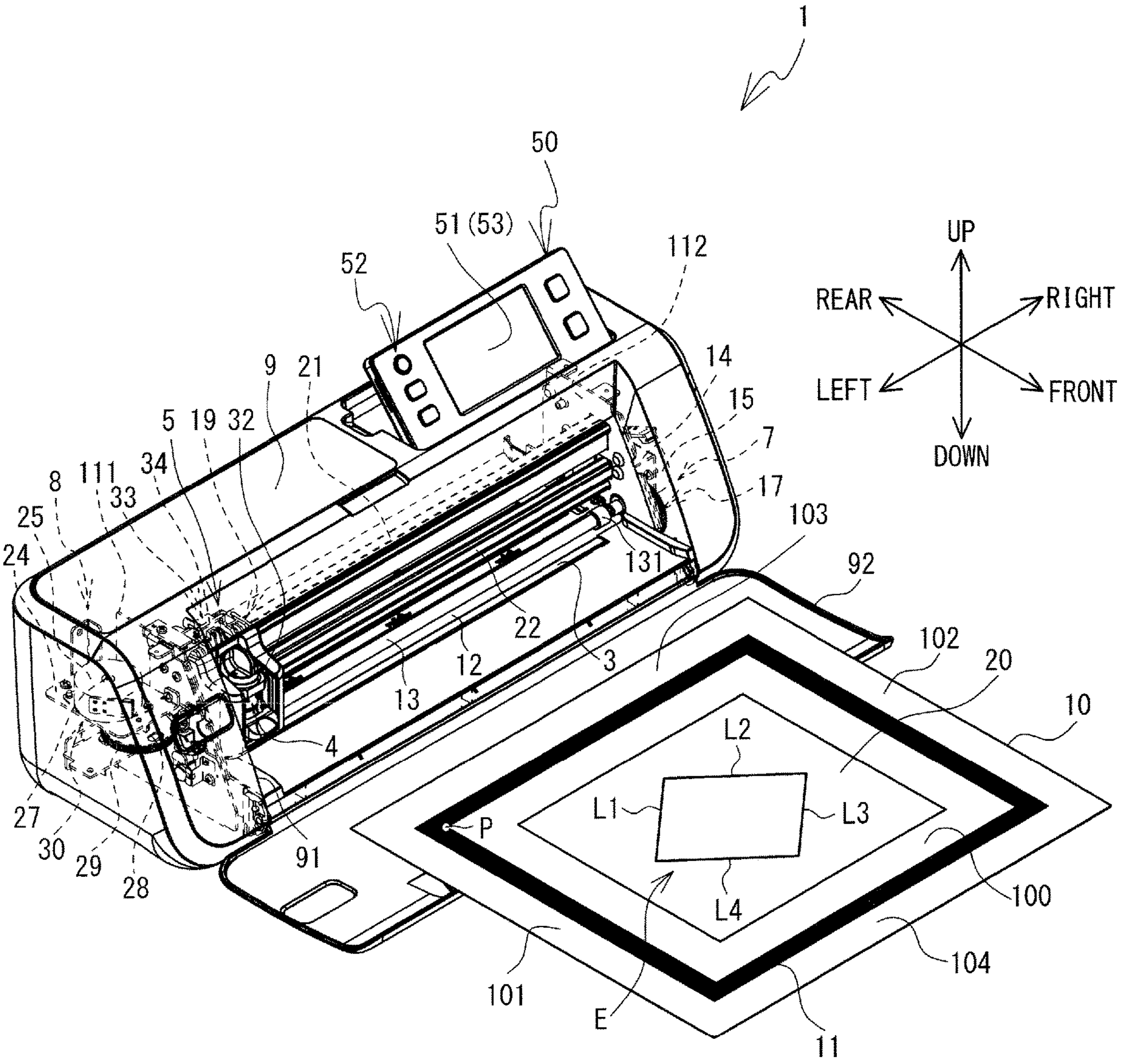
FIG. 1 is a perspective view of a cutting device.

As shown in FIG. 1, the cutting device 1 can cut a sheet-shaped cutting object 20 to be cut held by a holding member 10, in accordance with cutting data. The holding member 10 is configured to hold the cutting object 20. The holding member 10 is a rectangular mat having a predetermined thickness. The holding member 10 is made of a synthetic resin material, for example. A rectangular border 11 is printed on the top surface of the holding member 10. Excluding peripheral edge portions that are outside the border 11 (a left edge portion 101, a right edge portion 102, a rear edge portion 103, and a front edge portion 104) and the border 11, a substantially rectangular area inside the border 11 is a cutting region in which the cutting object 20 can be cut using the cutting device 1. An adhesive layer 100 over which an adhesive is applied is provided in the cutting area. The cutting object 20 is held by being adhered to the adhesive layer 100. The cutting object 20 is, for example, a work cloth, paper, or the like. The cutting device 1 is provided with the main body cover 9, a platen 3, a head 5, a conveyance mechanism 7, and a head movement mechanism 8.

The main body cover 9 is a housing having a substantially rectangular cuboid shape that is long in the left-right direction. An open portion 91, a cover 92, and the operation portion 50 are provided on the main body cover 9. The open portion 91 is an opening provided in a front surface portion of the main body cover 9. The cover 92 is a plate-shaped member that is long in the left-right direction. The lower end side of the cover 92 is rotatably supported on the main body cover 9. The open portion 91 is opened by opening the cover 92. The open portion 91 is closed by closing the cover 92. In FIG. 1, the cover 92 is open and the open portion 91 is thus open.

The operation portion 50 is provided on a right side section on the top surface of the main body cover 9. The operation portion 50 is provided with a liquid crystal display (LCD) 51, a plurality of operation switches 52, and a touch panel 53. Images including various items, such as commands, illustrations, setting values, and messages, may be displayed on the LCD 51. The touch panel 53 is provided on the surface of the LCD 51. A user may perform a depression operation (this operation is referred to as a "panel operation" below) on the touch panel 53, using a finger or a stylus pen. The cutting device 1 is configured to identify which item has been selected in correspondence to a depressed position detected by the touch panel 53. Using the operation switches 52 and the touch panel 53, the user can select a pattern displayed on the LCD 51, can set various parameters, and can perform an input operation or the like.

The platen 3 is provided inside the main body cover 9. The platen 3 is configured to support the holding member 10. The platen 3 is a plate-shaped member that extends in the left-right direction. The holding member 10 holding the cutting object 20 can be placed on the platen 3, which supports the bottom surface of the holding member 10. The holding member 10 is placed on the platen 3 in a state in which the open portion 91 is open.

The head 5 is provided with a carriage 19, a mounting portion 32, a detector 41, and an up-down drive mechanism 33. The mounting portion 32 and the up-down drive mechanism 33 are arranged, respectively, to the front and the rear of the carriage 19. A cartridge 4, which has a cutting blade 16, can be mounted on the mounting portion 32. The cartridge 4 is mounted on the mounting portion 32 in a state in which the cutting blade 16 is arranged on a lower end of the cartridge. The detector 41 is a position sensor configured to output the position of the mounting portion 32 in the third direction. As shown in FIG. 3, the detector 41 is disposed to the rear and the left of the mounting portion 32.

The up-down drive mechanism 33 moves the mounting portion 32 in the third direction to cause the mounting portion 32 to approach the platen 3 and in the fourth direction to cause the mounting portion 32 to separate from the platen 3. The third and fourth directions are orthogonal to the first direction and the second direction. The up-down drive mechanism 33 of a present embodiment decelerates and converts a rotational movement of a Z-axis motor 34 into an up-down movement, transmits the converted movement to the mounting portion 32, and thus drives the mounting portion 32 and the cartridge 4 in the up-down direction (also referred to as a Z direction). In other words, the Z-axis motor 34 drives the mounting portion 32 and the cartridge 4 in the up-down direction. As shown in FIG. 2 and FIG. 3, the up-down drive mechanism 33 includes gears 35 and 36, a shaft 37, a plate portion 48, a pinion 38, and a rack 39. The gear 35 is fixed to the front end of an output shaft 40 of the Z-axis motor 34. The gear 35 meshes with the gear 36. The diameter of the gear 35 is smaller than the diameter of the gear 36. The gear 36 includes a cylindrical shaft portion 46 that extends in the front-rear direction. The shaft 37 is inserted through the shaft portion 46 of the gear 36. The output shaft 40 of the Z-axis motor 34 and the shaft 37 extend in the front-rear direction.

The plate portion 48 is disc-shaped and is slightly smaller than the diameter of the gear 36. The front end portion of the plate portion 48 is coupled to the rear end portion of the pinion 38. The plate portion 48 is a member that is formed integrally with the pinion 38. The plate portion 48 is a member that is separate from the gear 36. The plate portion 48 and the pinion 38 can rotate, independently of the rotation of the gear 36. The shaft 37 is inserted through the pinion 38 and the plate portion 48 in front of the gear 36. The pinion 38 and the plate portion 48 can rotate relative to the shaft 37. The diameter of the pinion 38 is smaller than the diameters of the gears 35 and 36. The rack 39 extends in the up-down direction and gear teeth, which mesh with the pinion 38, are provided on the right surface of the rack 39. The rack 39 is fixed to the back surface of the mounting portion 32.

The up-down drive mechanism 33 is further provided with a pressure changing member 31. The pressure changing member 31 is a member configured to change a pressure applied to the mounting portion 32 in the third direction (the downward direction). The pressure changing member 31 of the present embodiment is a torsion spring that is inserted into the shaft portion 46 of the gear 36. One end of the pressure changing member 31 is fixed to the shaft portion 46, and the other end of the pressure changing member 31 is fixed to the plate portion 48. The pressure changing member 31 transmits the rotation of the gear 36 to the plate portion 48. The pressure changing member 31 changes the pressure applied to the mounting portion 32 in the third direction as a result of a compression amount of the torsion spring changing in accordance with the rotation of the gear 36. In other words, the compression amount of the torsion spring that is the pressure changing member 31 having the one end fixed to the shaft portion 46 changes in accordance with the rotation of the shaft portion 46 by the gear 36, and a force rotating the plate portion 48 to which the other end of the pressure changing member 31 is fixed thus changes. By changing the force rotating the plate portion 48, the pressure applied to the mounting portion 32 in the third direction changes.

When the output shaft 40 of the Z-axis motor 34 rotates in the clockwise direction, the gear 35 rotates in the clockwise direction, and the gear 36 rotates in the counterclockwise direction. The pressure changing member 31 transmits the rotation of the gear 36 to the plate portion 48. When the cutting blade 16 is not in contact with the cutting object 20 or with the holding member 10, a pressure directed in the fourth direction (the upward direction) is not applied to the mounting portion 32. Thus, in accordance with the rotation of the gear 36 being transmitted to the plate portion 48 by the pressure changing member 31, the plate portion 48 and the pinion 38 rotate in the counterclockwise direction by the same amount as the rotation of the gear 36. When the cutting blade 16 is in contact with the cutting object 20 or with the holding member 10, the mounting portion 32 receives the pressure directed in the fourth direction via the cutting blade 16. As a result, even when the rotation of the gear 36 is transmitted to the plate portion 48 by the pressure changing member 31, the plate portion 48 and the pinion 38 do not rotate until the pressure in the third direction transmitted to the mounting portion 32 exceeds the pressure in the fourth direction applied to the mounting portion 32. In this state, when the output shaft 40 of the Z-axis motor 34 rotates further in the clockwise direction, the gear 36 rotates relative to the plate portion 48 and the pinion 38, and the torsion of the pressure changing member 31 increases. As a result of this, the pressure applied to the mounting portion 32 in the third direction by the pressure changing member 31 via the plate portion 48 and the pinion 38 increases. When the pressure in the third direction transmitted from the pressure changing member 31 to the mounting portion 32 exceeds the pressure applied to the mounting portion 32 in the fourth direction, the pinion 38 rotates, and the mounting portion 32 moves in the third direction. In this case, the rotation amount of the pinion 38 may be different to the rotation amount of the gear 36, or the rotations amounts may be the same as each other. In contrast, when the output shaft 40 of the Z-axis motor 34 rotates in the counterclockwise direction, the gear 35 rotates in the counterclockwise direction, and the gear 36 and the pinion 38 rotate in the clockwise direction. At this time, the mounting portion 32 moves together with the rack 39 in the fourth direction. The cartridge 4 mounted on the mounting portion 32 moves between a cutting position and a raised position in accordance with the driving of the Z-axis motor 34. The cutting position is a position that is determined in cutting processing to be described later, and is a position of the mounting portion 32 in the up-down direction when the cutting object 20 is cut in accordance with the cutting data. The raised position is a position at which the mounting portion 32 is separated by a predetermined distance, in the up-down direction, from the cutting object 20.

The rotation amount of the Z-axis motor 34 has a correlation with the pressure in the third direction applied to the mounting portion 32 by the pressure changing member 31 when the cutting blade 16 is in contact with the cutting object 20 or with the holding member 10. The Z-axis motor 34 of the present embodiment is a pulse motor, and a rotation angle of the output shaft 40 of the Z-axis motor 34 is proportional to a pulse input to the Z-axis motor 34. Thus, an input pulse number of the Z-axis motor 34 has a correlation with the pressure, to the platen 3 side, applied to the mounting portion 32 by the pressure changing member 31. In the present embodiment, the pulse number input into the Z-axis motor 34 is used as a pressure correspondence value that corresponds to the pressure in the third direction applied to the mounting portion 32 by the pressure changing member 31.

The conveyance mechanism 7 and the head movement mechanism 8 are configured to cause the holding member 10 placed on the platen 3 and the mounting portion 32 to move relative to each other in the first direction and the second direction that is orthogonal to the first direction. The conveyance mechanism 7 is configured to be able to move the holding member 10 set on the platen 3 in the front-rear direction (also referred to as a Y direction) of the cutting device 1. The conveyance mechanism 7 is provided with a drive roller 12, a pinch roller 13, an attachment frame 14, a Y-axis motor 15, and a deceleration mechanism 17. A pair of side wall portions 111 and 112 are provided facing each other inside the main body cover 9. The side wall portion 111 is positioned on the left side of the platen 3. The side wall portion 112 is positioned on the right side of the platen 3. The drive roller 12 and the pinch roller 13 are rotatably supported between the side wall portions 111 and 112. The drive roller 12 and the pinch roller 13 are configured to convey the holding member 10. The drive roller 12 and the pinch roller 13 extend in the left-right direction (also referred to as an X direction) of the cutting device 1, and are installed so as to be aligned with each other in the up-down direction. A roller portion (not shown in the drawings) is provided on a left portion of the pinch roller 13, and a roller portion 131 is provided on the right end of the pinch roller 13.

The attachment frame 14 is fixed to an outer surface side (the right side) of the side wall portion 112. The Y-axis motor 15 is attached to the attachment frame 14. The Y-axis motor 15 is a pulse motor, for example. An output shaft of the Y-axis motor 15 is fixed to a drive gear (not shown in the drawings) of the deceleration mechanism 17. The drive gear meshes with a driven gear (not shown in the drawings). The driven gear is fixed to the right end of the drive roller 12.

When the holding member 10 is conveyed, the left edge portion 101 of the holding member 10 is clamped between the drive roller 12 and the roller portion (not shown in the drawings) provided on the left side of the pinch roller 13. The right edge portion 102 of the holding member 10 is clamped between the drive roller 12 and the roller portion 131. When the Y-axis motor 15 is driven to rotate forward or driven to rotate in reverse, the rotational movement of the Y-axis motor 15 is transmitted to the drive roller 12 via the deceleration mechanism 17. That is to say, the Y-axis motor 15 is configured to drive the drive roller 12. In this way, the holding member 10 is conveyed toward the rear or toward the front.

The head movement mechanism 8 is configured to move the head 5 in a direction intersecting the conveyance direction of the holding member 10, namely, in the X direction. Specifically, the movement direction of the head 5 is orthogonal to the conveyance direction of the holding member 10. The head movement mechanism 8 is provided with a pair of upper and lower guide rails 21 and 22, an attachment frame 24, an X-axis motor 25, a drive gear 27, a driven gear 29, a transmission mechanism 30, and the like. The drive gear 27 and the driven gear 29 function as a deceleration mechanism. The guide rails 21 and 22 are fixed between the side wall portions 111 and 112. The guide rails 21 and g 22 are positioned above and slightly to the rear of the pinch roller 13. The guide rails 21 and 22 extend substantially in parallel to the pinch roller 13, namely, in the X direction. The carriage 19 of the head 5 is supported by the guide rails 21 and 22 such that the carriage 19 can move in the X direction along the guide rails 21 and 22.

The attachment frame 24 is fixed to the rear portion of an outer surface side (the left side) of the side wall portion 111. The X-axis motor 25 is provided to the rear of the attachment frame 24 and is attached so as to be oriented downward. The drive gear 27 is fixed to an output shaft of the X-axis motor 25. The X-axis motor 25 is a pulse motor, for example. The driven gear 29 meshes with the drive gear 27. Although not shown in the drawings, the transmission mechanism 30 has a pair of left and right timing pulleys, and an endless timing belt that is stretched over the pair of left and right timing pulleys. One of the timing pulleys 28 is provided on the attachment frame 24 so as to be able to rotate integrally with the driven gear 29. The other of the timing pulleys is provided on the attachment frame 14. The timing belt extends in the X direction and is coupled to the carriage 19.

The head movement mechanism 8 converts the rotational movement of the X-axis motor 25 into a movement in the X direction, and transmits the movement in the X direction to the carriage 19. When the X-axis motor 25 is driven to rotate forward or driven to rotate in reverse, the rotational movement of the X-axis motor 25 is transmitted to the timing belt via the drive gear 27, the driven gear 29, and the timing pulleys 28. In this way, the carriage 19 is moved in the left direction or the right direction. Then, the head 5 moves in the X direction by driving the X-axis motor 25.

Figure 4:
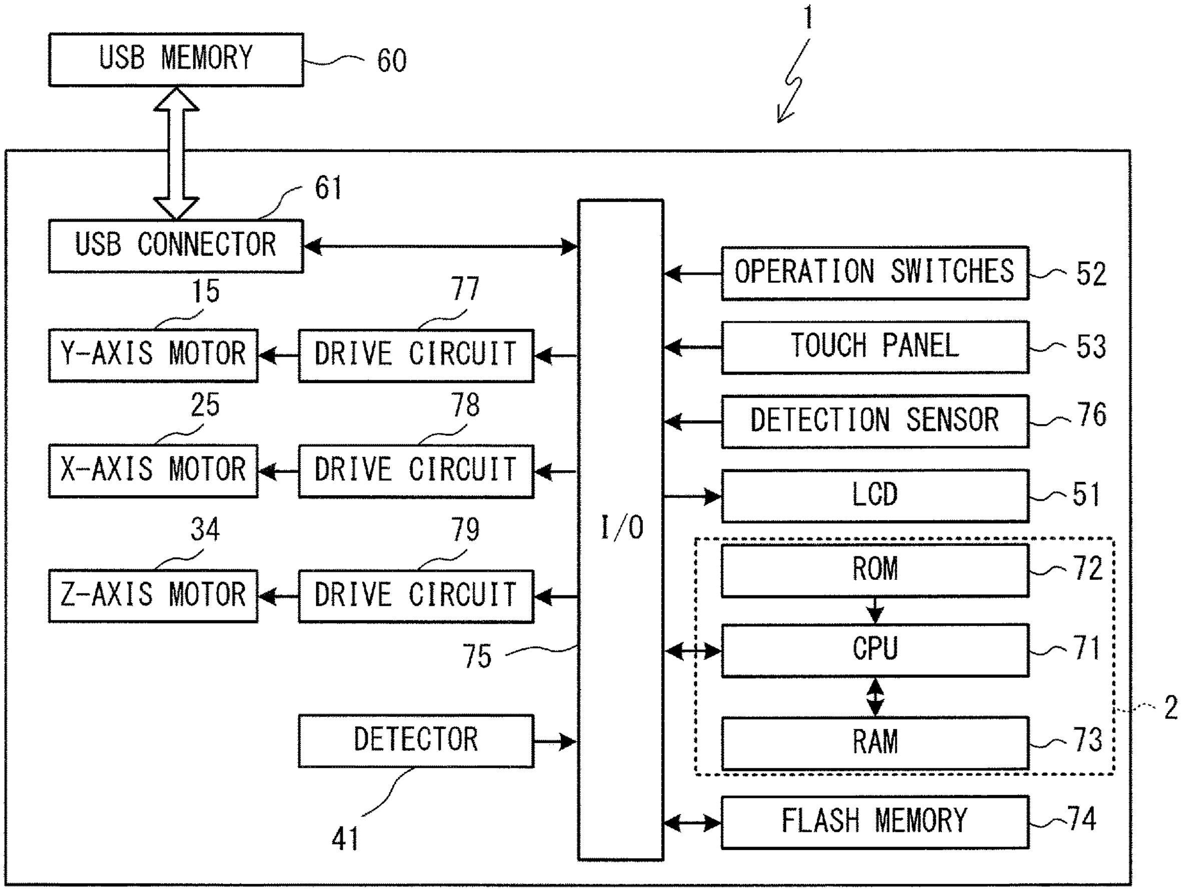
FIG. 4 is a block diagram showing an electrical configuration of the cutting device.

The electrical configuration of the cutting device 1 will be explained with reference to FIG. 4. As shown in FIG. 4, the cutting device 1 is provided with a CPU 71, a ROM 72, a RAM 73, and an input/output (I/O) interface 75. The CPU 71 is electrically connected to the ROM 72, the RAM 73, and the I/O interface 75. Along with the ROM 72 and the RAM 73, the CPU 71 configures a control portion 2, and executes main control of the cutting device 1. The ROM 72 may store various programs and the like used to operate the cutting device 1. The programs are programs that cause the cutting device 1 to perform main processing to be described later, for example. The RAM 73 may temporarily store various programs, various data, setting values input by operation of the operation switches 52 and the like, arithmetic results of arithmetic processing by the CPU 71 and the like.

A flash memory 74, the operation switches 52, the touch panel 53, a detection sensor 76, the detector 41, the LCD 51, a USB connector 61, and drive circuits 77 to 79 are further connected to the I/O interface 75. The flash memory 74 is a nonvolatile storage element that stores various parameters and the like.

The detection sensor 76 detects the leading end of the holding member 10 set on the platen 3. A detection signal of the detection sensor 76 is input to the control portion 2. The detector 41 outputs the position, in the third direction, of the mounting portion 32. On the basis of the output of the detector 41, the control portion 2 of the present embodiment identifies the position of the mounting portion 32, using the position of the platen 3 in the third direction as a reference. The reference for the position in the third direction of the mounting portion 32 may be changed as appropriate. The control portion 2 is configured to control the LCD 51 to display an image. The LCD 51 can perform notification of various commands. The USB connector 61 can be connected to a USB memory 60. When the USB memory 60 is connected to the USB connector 61, the control portion 2 can access various storage areas provided in the USB memory 60. Each of the drive circuits 77 to 79 respectively drive the Y-axis motor 15, the X-axis motor 25, and the Z-axis motor 34. On the basis of the cutting data, the control portion 2 is configured to control the Y-axis motor 15, the X-axis motor 25, the Z-axis motor 34 and the like, and automatically causes the cutting of the cutting object 20 on the holding member 10. The cutting data includes coordinate data in order to control the conveyance mechanism 7 and the head movement mechanism 8. The coordinate data is expressed using a cutting coordinate system set in the cutting area. An origin point of the cutting coordinate system of the present embodiment is a point P at the rear left of the rectangular cutting area, the left-right direction is set as the X direction, and the front-rear direction is set as the Y direction.

An overview of the main processing performed by the cutting device 1 will be explained. The main processing is processing to cut the cutting object 20 held by the holding member 10 in accordance with the cutting data, after determining the cutting position in accordance with the cutting object 20. More specifically, the control portion 2 acquires the cutting data by the main processing. In a state in which the cutting blade 16 mounted on the mounting portion 32 is separated from the holding member 10 placed on the platen 3, the control portion 2 controls the drive circuits 77 and 78 and drives the Y-axis motor 15 and the X-axis motor 25, thus controlling the conveyance mechanism 7 and the head movement mechanism 8 to move the mounting portion 32, relative to the holding member 10, in the first direction (the front-rear direction) and the second direction (the left-right direction) to a predetermined position. By driving the Z-axis motor 34, the control portion 2 controls the up-down drive mechanism 33, and, at the predetermined position, causes the mounting portion 32 to approach the platen 3, and acquires a contact position, which is a position in the third direction (the downward direction) output by the detector 41 when the cutting blade 16 comes into contact with the holding member 10. After the control portion 2 controls the up-down drive mechanism 33 to separate the cutting blade

16 mounted on the mounting portion 32 and the holding member 10, the control portion 2 controls the conveyance mechanism 7 and the head movement mechanism 8 in accordance with the acquired cutting data to move the mounting portion 32 and the holding member 10 relative to each other to a cutting start position at which the mounting portion 32 faces the cutting object 20 held by the holding member 10. The control portion 2 controls the up-down drive mechanism 33, at the cutting start position, to move the mounting portion 32 in the third direction to the cutting position set on the basis of the acquired contact position. The cutting blade 16 penetrates through the cutting object 20, and slightly pierces the holding member 10. The control portion 2 controls the conveyance mechanism 7 and the head movement mechanism 8 in accordance with the acquired cutting data, to move the holding member 10 placed on the platen 3 and the mounting portion 32 relative to each other in the first direction and the second direction, and cuts the cutting object 20 using the cutting blade 16 mounted on the mounting portion 32. In this way, the cutting object 20 is cut in a shape instructed by the cutting data.

The main processing according to the present embodiment will be explained with reference to FIG. 5 to FIG. 11. When a start command has been input by a panel operation or the like, the control portion 2 of the cutting device 1 reads out the program stored in the flash memory 74 to the RAM 73, and performs the main processing in accordance with commands included in the program. As specific examples 1 to 4, cases will be explained in which the cutting object 20 is cut along a pattern E shown in FIG. 1, for each of the cutting objects 20 for which the positions in the up-down direction of the mounting portion 32 corresponding to the pressure correspondence values are indicated by examples 55 to 58. The pattern E is a square-shaped pattern including line segments L1, L2, L3, and L4. Each of the main processing relating to the specific examples 1 to 4 is performed at mutually different timings, but, for ease of explanation, will be explained in parallel.

Figure 5:
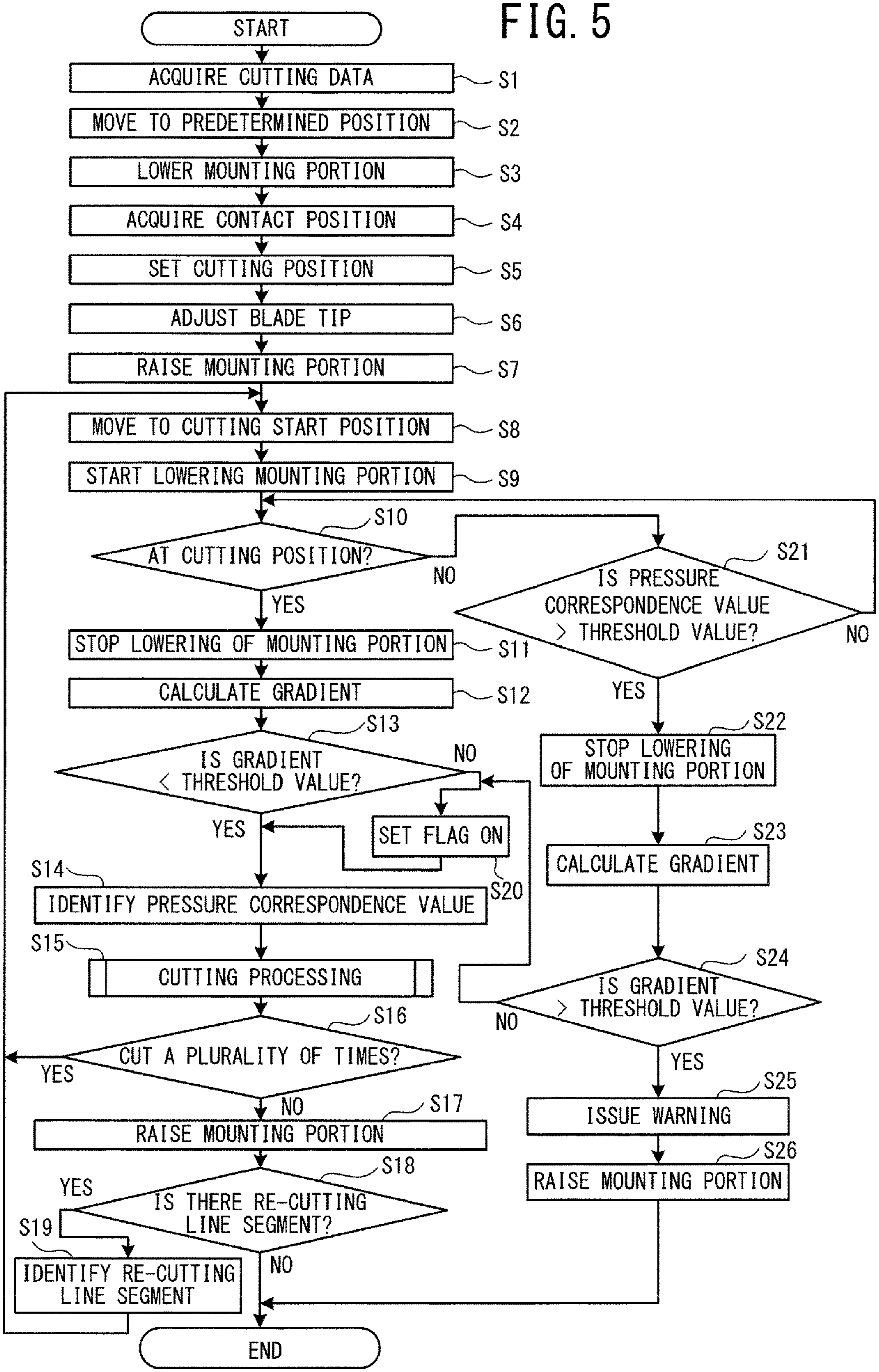
FIG. 5 is a flowchart of main processing.

As shown in FIG. 5, in the main processing, the control portion 2 acquires the cutting data (step S1). In each of the specific examples 1 to 4, the cutting data for cutting the cutting object 20 along the pattern E is acquired. By controlling the drive circuits 77 and 78 to drive the Y-axis motor 15 and the X-axis motor 25, the control portion 2 controls the conveyance mechanism 7 and the head movement mechanism 8 to relatively move the mounting portion 32, with respect to the holding member 10, to the predetermined position (step S2). The processing at step S2 is performed in the state in which the blade 16 mounted on the mounting portion 32 and the holding member 10 placed on the platen 3 are separated from each other. The predetermined position of the present embodiment is an adjustment position at which known blade tip adjustment is performed (for example, refer to Japanese Laid-Open Patent Publication No. H2-262995, the relevant portions of which are herein incorporated by reference), and more specifically, is a position, of the border 11, that is inside an adjustment region that is above the rear edge of the border 11.

Figure 6:
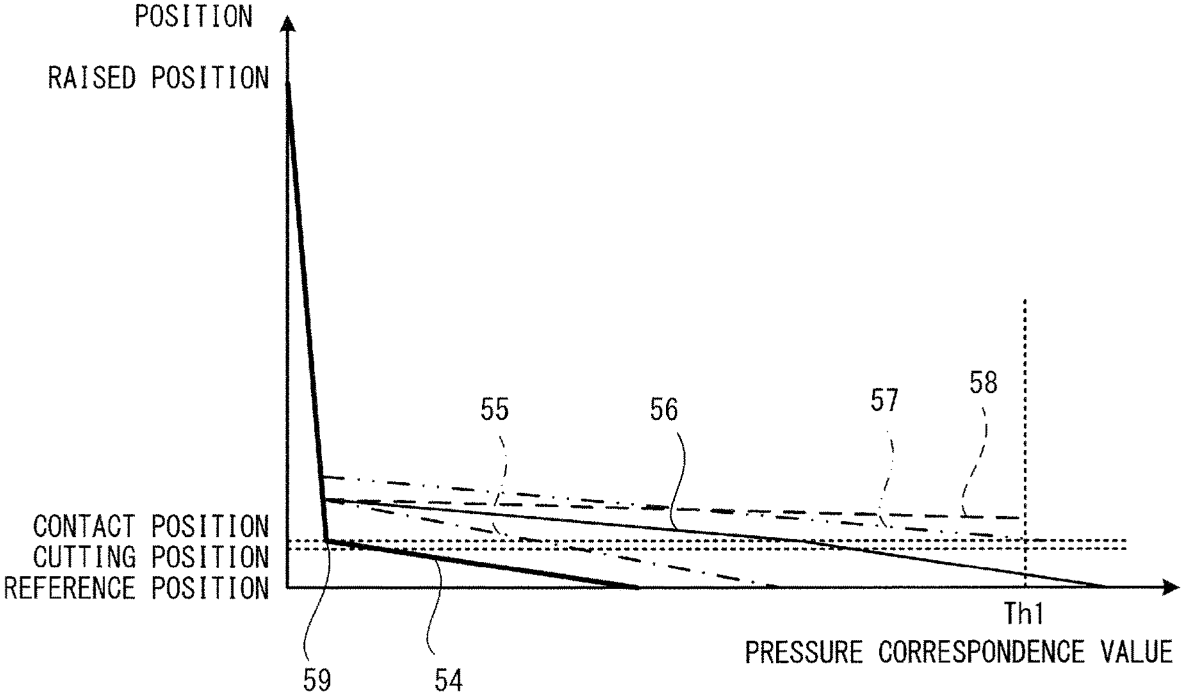
FIG. 6 is a graph showing changes in a position in the up-down direction of the mounting portion corresponding to a pressure correspondence value of a cutting object to be cut in specific examples 1 to 4.
Figure 8:
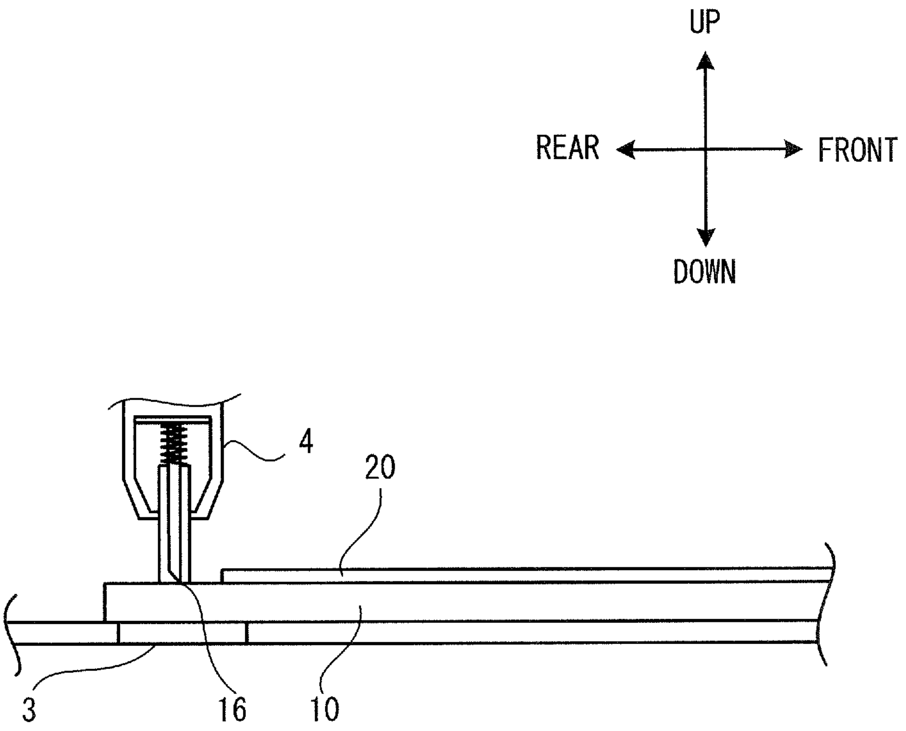
FIG. 8 is an explanatory diagram of a position of a holding member and the cutting object with respect to a cutting blade when the position of the holding member with respect to the mounting portion in a first direction and a second direction is a predetermined position, and the position of the mounting portion in the up-down direction is a contact position.

As shown in FIG. 8, the control portion 2 controls the up-down drive mechanism 33, at the predetermined position at step S2, to cause the mounting portion 32 to approach the platen 3 (step S3). The control portion 2 acquires the contact position, which is the position in the third direction output by the detector 41 when the cutting blade 16 comes into contact with the holding member 10 (step S4). The control portion 2 counts, as the pressure correspondence value, the pulse number input into the Z-axis motor 34 (the drive circuit 79) when moving the mounting portion 32 in the third direction, and acquires the position of the mounting portion 32 corresponding to the pressure correspondence value on the basis of the signal output from the detector 41. A relationship between the position of the mounting portion 32 in the up-down direction at the predetermined position at step S2, and the pressure correspondence value (the number of pulses input to the Z-axis motor 34) is indicated by the example 54 in FIG. 6. As shown in FIG. 6, there is a point 59 at which a gradient of the position of the mounting portion 32 corresponding to the pressure correspondence value changes. The control portion 2 of the present embodiment causes the mounting portion 32 to approach the platen 3, and acquires, as the contact point, the position in the up-down direction of the mounting portion 32 at the point 59 at which the gradient of the position of the mounting portion 32 in the up-down direction corresponding to the pressure correspondence value changes. When the control portion 2 detects that the gradient has changed, the control portion 2 controls the up-down drive mechanism 33 to stop the movement of the mounting portion 32 in the third direction.

The control portion 2 sets the cutting position on the basis of the acquired contact position (step S5). The control portion 2 of the present embodiment sets, as the cutting position, a position at which the mounting portion 32 has been moved in the third direction from the contact position acquired by the processing at step S4 by a predetermined distance that is smaller than the thickness of the holding member 10. The thickness of the holding member 10 may be acquired on the basis of the output of the detector 41, or may be stored in advance in the flash memory 74 or the like, and is 4 mm, for example. The predetermined distance may be stored in advance in the flash memory 74 or the like, or may be set by a user, and is 1 mm, for example.

Figure 9:
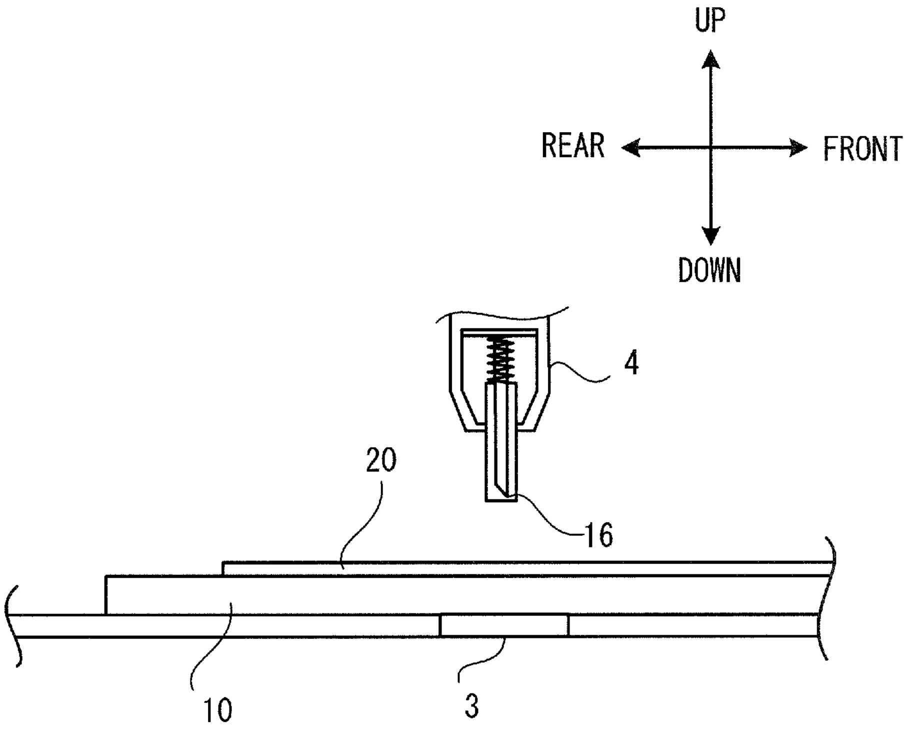
FIG. 9 is an explanatory diagram of the position of the holding member and the cutting object with respect to the cutting blade when the position of the holding member with respect to the mounting portion in the first direction and the second direction is a cutting start position, and the position of the mounting portion in the up-down direction is a raised position.

In the state in which the cutting blade 16 is in contact with the holding member 10 as a result of the processing at step S3, the control portion 2 controls the conveyance mechanism 7 and the head movement mechanism 8 to perform the known blade tip adjustment to adjust the orientation of the cutting blade 16, in the adjustment region (step S6). The control portion 2 controls the up-down drive mechanism 33 to raise the mounting portion 32 to the raised position (step S7). As shown in FIG. 9, the control portion 2 controls the conveyance mechanism 7 and the head movement mechanism 8, in accordance with the cutting data acquired at step S1, to move the mounting portion 32 and the holding member 10 relative to each other to the cutting start position in which the mounting portion 32 faces the cutting object 20 held by the holding member 10 (step S8). In the specific examples, the mounting portion 32 and the holding member 10 are moved relative to each other to a position at which the cutting blade 16 is disposed above a position of an intersection of the line segment L1 and the line segment L2.

Figure 10:
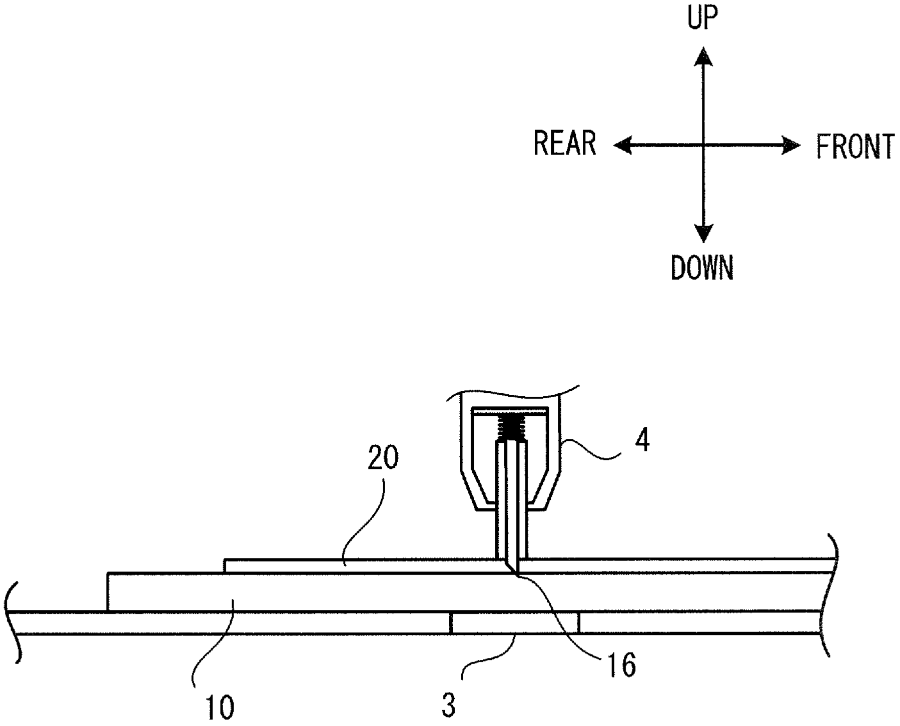
FIG. 10 is an explanatory diagram of the position of the holding member and the cutting object with respect to the cutting blade when the position of the holding member with respect to the mounting portion in the first direction and the second direction is a cutting start position, and the position of the mounting portion in the up-down direction is a raised position.

The control portion 2 controls the up-down drive mechanism 33, at the cutting start position, to start processing to move the mounting portion 32 in the third direction to the cutting position set on the basis of the acquired contact position (step S9). The control portion 2 counts, as the pressure correspondence value, the pulse number input into the Z-axis motor 34 (the drive circuit 79) when moving the mounting portion 32 in the third direction, and acquires the position of the mounting portion 32 corresponding to the pressure correspondence value on the basis of the signal output from the detector 41. As shown in FIG. 10, on the basis of the output of the detector 41, the control portion 2 determines whether the mounting portion 32 has been moved to the cutting position (step S10). When the mounting portion 32 has not been moved to the cutting position (no at step S10), the control portion 2 determines whether the pressure correspondence value is greater than a threshold value Th1 (step S21). The threshold value Th1 is established in advance while taking the strength and the like of the cutting blade 16 into account, and may be stored in the flash memory 74 or the like, or may be specified by the user. When the pressure correspondence value is not greater than the threshold value Th1 (no at step S21), the control portion 2 returns the processing to the processing at step S10.

As in the specific example 1 indicated by the example 55 in FIG. 6, and the specific example 2 indicated by the example 56, when the mounting portion 32 has been moved to the cutting position (yes at step S10) before the pressure correspondence value reaches the threshold value Th1, the control portion 2 controls the up-down drive mechanism 33 to stop the movement of the mounting portion 32 in the third direction that was started in the processing at step S9 (step S11). The control portion 2 calculates the gradient of the position of the mounting portion 32 corresponding to the pressure correspondence value at a time point at which the mounting portion 32 reaches the cutting position (step S12). When the cutting object 20 is placed on the holding member 10, at a time point at which contact is made with the cutting object 20, the gradient of the position of the mounting portion 32 corresponding to the pressure correspondence value changes. At step S12, the gradient of the position of the mounting portion 32 corresponding to the pressure correspondence value is calculated from after the contact with the cutting object 20 until the driving of the Z-axis motor 34 is stopped by the processing at step S11.

The control portion 2 determines whether the gradient calculated by the processing at step S12 is smaller than a threshold value Th2 (step S13). The threshold value Th2 is established in advance while taking the strength and the like of the cutting blade 16 into account, and may be stored in the flash memory 74 or the like, or may be specified by the user. In the specific example 1, the gradient calculated at step S12 is determined to be smaller than the threshold value Th2 (yes at step S13), and the control portion 2 identifies the pressure correspondence value at which the cutting object 20 can be cut in accordance with the cutting data (step S14) by the cutting processing being performed once. Specifically, the control portion 2 identifies the pressure correspondence value when the processing to move the mounting portion 32 in the third direction is stopped at step S11 (step S14).

Figure 7:
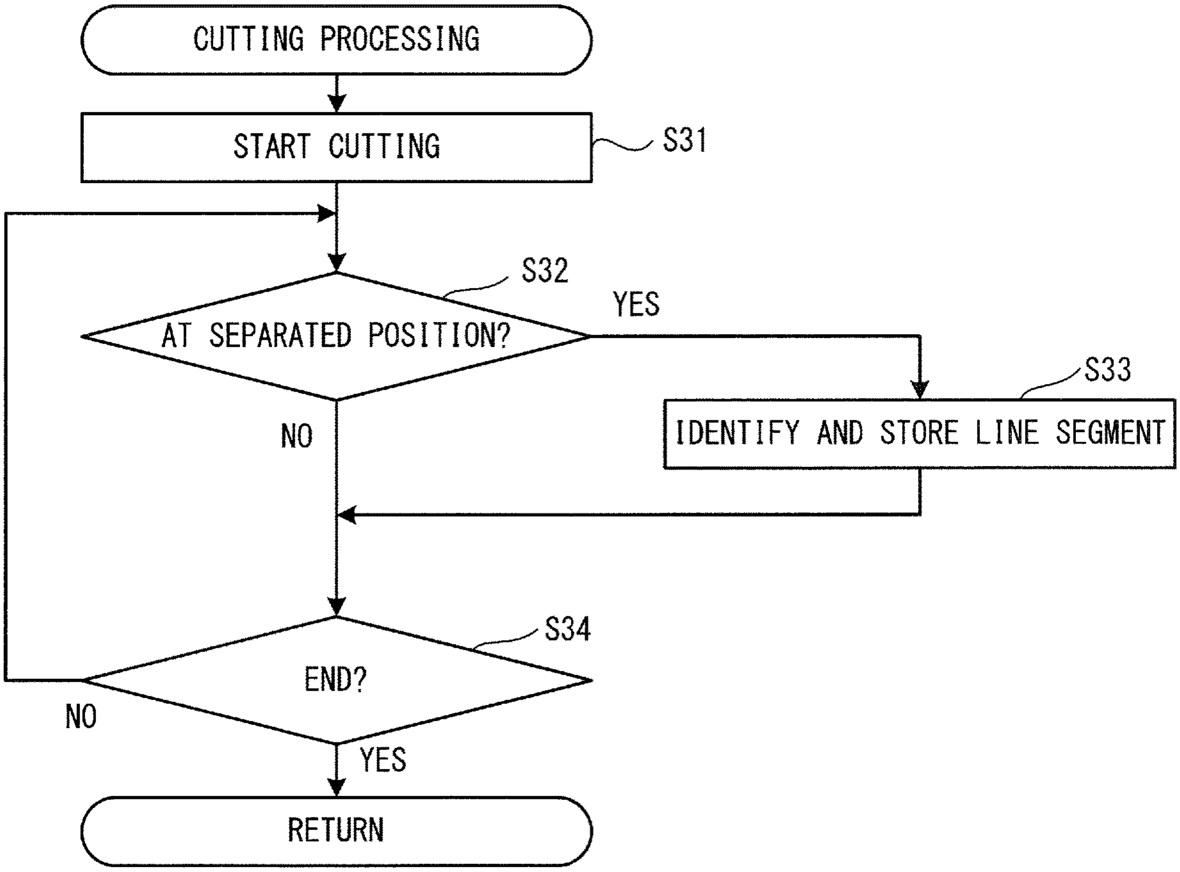
FIG. 7 is a flowchart of cutting processing performed by main processing shown in FIG. 5.
Figure 11:
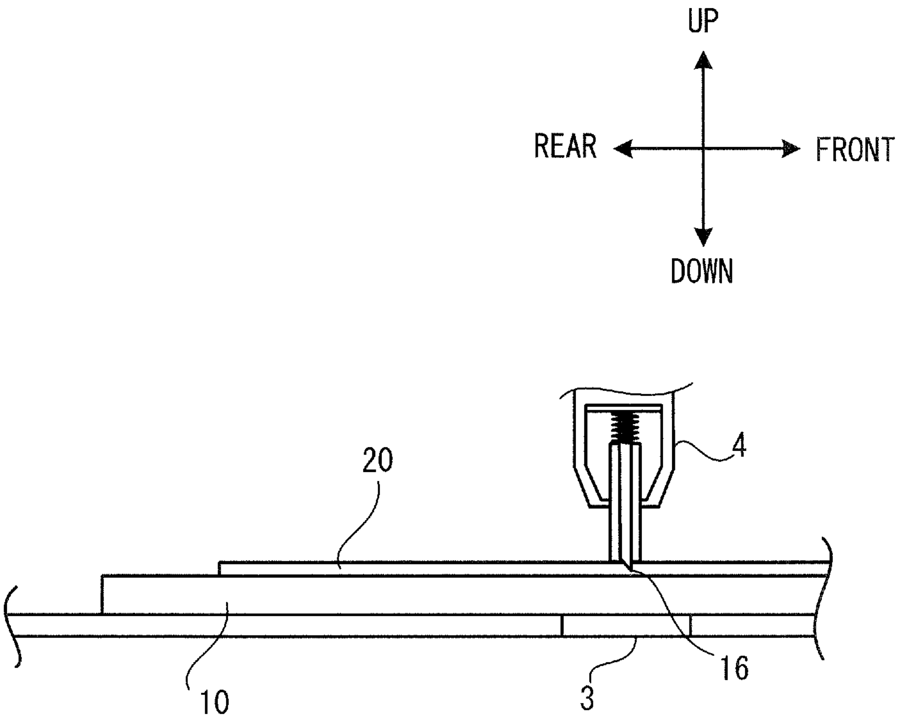
FIG. 11 is an explanatory diagram of the position of the holding member and the cutting object with respect to the cutting blade when the position of the holding member with respect to the mounting portion in the first direction and the second direction is a line segment cutting position, and the position of the mounting portion in the up-down direction is a separated position.

The control portion 2 controls the up-down drive mechanism 33 so as to obtain the pressure correspondence value identified at step S14, and performs the cutting processing to perform the cutting in accordance with the cutting data acquired at step S1 (step S15). The control portion 2 of the present embodiment performs the control such that the pressure correspondence value identified at step S14 is obtained, by maintaining the stopped state of the Z-axis motor 34 at step S11. As shown in FIG. 7, in the cutting processing, the control portion 2 sequentially reads the coordinate data included in the cutting data, controls the conveyance mechanism 7 and the head movement mechanism 8 in accordance with the coordinate data, and starts processing to cut the cutting object 20 using the cutting blade 16 (step S31). The processing to control the conveyance mechanism 7 and the head movement mechanism 8 in accordance with the coordinate data is continued until all of the coordinate data included in the cutting data has been read out. During a period in which the cutting object 20 is being cut on the basis of the cutting data, the control portion 2 determines whether the position output by the detector 41 is a separated position that is further in the fourth direction than the contact position (step S32). As shown in FIG. 11, when the separated position is obtained (yes at step S32), the control portion 2 identifies the line segment currently being cut on the basis of the cutting data, and stores the coordinate data in the RAM 73 in order to cut a re-cutting line segment that is the identified line segment (step S33). When the separated position is not obtained (no at step S32), or subsequent to step S33, the control portion 2 determines whether the processing to control the conveyance mechanism 7 and the head movement mechanism 8 in accordance with the coordinate data included in the cutting data has ended (step S34). When the processing is not ended (no at step S34), the control portion 2 returns the processing to step S32. When the processing has ended (yes at step S34), the control portion 2 ends the cutting processing and returns the processing to the main processing in FIG. 5.

The control portion 2 refers to a flag in the RAM 73 and determines whether the cutting object 20 is to be cut by performing the cutting processing a plurality of times (step S16). The flag indicates whether the cutting processing is to be performed the plurality of times. An initial value of the flag is OFF, and when the flag is OFF, the control portion 2 determines that the cutting object 20 is to be cut by the cutting processing being performed once. When the flag is ON, the control portion 2 determines that the cutting object 20 is to be cut by the cutting processing being performed the plurality of times. In specific example 1, the control portion 2 determines that the cutting object 20 is to be cut by the cutting processing being performed once (no at step S16), and the control portion 2 raises the mounting portion 32 to the raised position (step S17). The control portion 2 refers to the RAM 73, and determines whether the coordinate data of the re-cutting line segment has been stored at step S33 (step S18). When the coordinate data of the re-cutting line segment has not been stored (no at step S18), the control portion 2 ends the main processing.

When the coordinate data of the re-cutting line segment has been stored (yes at step S18), the control portion 2 refers to the RAM 73 and identifies the re-cutting line segment (step S19). The control portion 2 returns the processing to step S8, and the control portion 2 identifies the cutting start position of the re-cutting line segment. After the control portion 2 controls the conveyance mechanism 7 and the head movement mechanism 8 in accordance with the cutting data to relatively move the mounting portion 32 to the cutting start position of the re-cutting line segment (step S8), the control portion 2 controls the up-down drive mechanism 33 to move the mounting portion 32 in the third direction to the cutting position (step S9). At the cutting start position, as described above, the control portion 2 identifies the pressure correspondence value (step S14) to perform the cutting processing relating to the re-cutting line segment that is determined to have a portion for which the position output by the detector 41 is the separated position (step S15). By the processing at step S15, when the position output by the detector 41 is the separated position, the control portion 2 once more cuts the cutting object 20 using the cutting blade 16, on the basis of the cutting data acquired at step S1. When there is a plurality of the re-cutting line segments, the cutting processing relating to each of the re-cutting line segments may be performed individually. When there is the plurality of re-cutting line segments, the plurality of re-cutting line segments may be joined along a pattern indicated by the cutting data, and a line segment group including the plurality of re-cutting line segments may be cut by the cutting processing being performed once. For example, in the pattern E, when the line segment L1 and the line segment L3 are the re-cutting line segments, the line segment L1 and the line segment L3 joined by the line segment L2 or the line segment L4 may be taken as the continuous line segment group, and the cutting processing may be performed once for the continuous line segment group.

In the specific example 2, the control portion 2 determines that the gradient is equal to or greater than the threshold value Th2 (no at step S13), and the control portion 2 sets the flag stored in the RAM 73 to ON (step S20). Through the cutting processing performed a plurality of times, the control portion 2 identifies the pressure correspondence value at which the cutting object 20 can be cut in accordance with the cutting data (step S14). Specifically, when the processing to move the mounting portion 32 in the third direction is stopped at step S11, the control portion 2 identifies a value that is smaller than the pressure correspondence value (step S14). In this case, the pressure correspondence value may be set in advance in the flash memory 74 or the like, or may be a value set by the user. The control portion 2 controls the up-down drive mechanism 33 such that the pressure correspondence value identified at step S14 is obtained, and performs the cutting processing to perform the cutting in accordance with the cutting data, in a similar manner to that described above (step S15).

In the specific example 3 indicated by the example 57 in FIG. 6, and the specific example 4 indicated by the example 58, in the processing at step S21, the control portion 2 determines that the pressure correspondence value is larger than the threshold value Th1 (yes at step S21). In this case, the control portion 2 controls the up-down drive mechanism 33 to stop the lowering of the mounting portion 32 (step S22), then calculates the gradient of the position of the mounting portion 32 corresponding to the pressure correspondence value at the point in time at which the processing at step S22 is performed (step S23). The control portion 2 determines whether the gradient calculated in the processing at step S23 is larger than a threshold value Th3 (step S24). The threshold value Th3 is larger than the threshold value Th2. In the specific example 3, the control portion 2 determines that the gradient is smaller than the threshold value Th3 (no at step S24), and the control portion 2 shifts the processing to the above-described step S20. In the cutting start position, even when a predetermined pressure is applied to the mounting portion 32 by the pressure changing member 31 in the third direction, there is a case in which the mounting portion 32 cannot be moved in the third direction as far as the cutting position. In this type of case, after the pressure changing member 31 moves the mounting portion 32 by a distance, in the third direction, over which the mounting portion 32 can be moved by applying a pressure that is equal to or less than the predetermined pressure, by repeating the cutting processing a number of times, the control portion 2 cuts the cutting object 20. The predetermined pressure of the present embodiment is a pressure for the case in which the pressure correspondence value is the threshold value Th1. Specifically, after setting the flag to ON, the control portion 2 identifies a value smaller than the pressure correspondence value (the threshold value Th1) at the time at which the processing to move the mounting portion 32 in the third direction is stopped at step S22 (step S14). This identified pressure correspondence value may be stored in advance in the flash memory 74 or the like, or may be a value set by the user. The control portion 2 controls the up-down drive mechanism 33 such that the pressure correspondence value identified at step S14 is obtained, and performs the cutting processing that performs the cutting in accordance with the cutting data in a similar manner to that described above (step S15). At step S15 when the flag is ON, the processing at step S32 and step S33 may be omitted. At step S16, the control portion 2 determines that the cutting object 20 is to be cut by performing the cutting processing the plurality of times (yes at step S16), and the control portion 2 returns the processing to step S8. How many times the cutting processing is to be performed may be determined as appropriate while taking into account the gradient calculated at step S23, an amount of time required for the processing, and the like. The processing to set the flag to OFF may be performed when the cutting processing is performed the number of times determined at step S15.

In a specific case, at the start cutting position, in which the mounting portion 32 cannot be moved in the third direction to the cutting position even when the pressure has been applied to the mounting portion 32 by the pressure changing member 31 (yes at step S21), the control portion 2 of the present embodiment cancels the execution of the cutting processing (no at step S24). The specific case of the present embodiment is a case in which the gradient calculated at step S23 is greater than the threshold value Th3. In the specific example 4, the control portion 2 determines that the gradient is greater than the threshold value Th3 (yes at step S24), and the control portion 2 issues a warning to cancel the cutting processing (step S25). The control portion 2 of the present embodiment displays a warning message on the LCD 51. The control portion 2 controls the up-down drive mechanism 33, raises the mounting portion 32 to the raised position (step S26), and ends the main processing.

The cutting device 1 of the above-described embodiment moves the position of the mounting portion 32 in the third direction to the cutting position and cuts the cutting object 20. The cutting position is set, at the predetermined position, on the basis of the contact position, which is the position in the third direction at which the cutting blade 16 comes into contact with the holding member 10 when the mounting portion 32 is caused to approach the platen 3. Even when conditions such as the thickness and hardness of the cutting object 20 are mutually different, the cutting device 1 can set the position of the mounting portion 32 in the third direction to the similar cutting position when performing the cutting processing. Thus, the cutting device 1 can cut the cutting object 20 under conditions more suitable for the actual cutting object 20, compared to a known device.

The up-down drive mechanism 33 of the cutting device 1 is provided with the pressure changing member 31 that is configured to change the pressure, in the third direction, applied to the mounting portion 32. The control portion 2 identifies the pressure correspondence value corresponding to the pressure applied to the mounting portion 32 when the mounting portion 32 is moved in the third direction as far as the contact position (step S14). The control portion 2 controls the up-down drive mechanism 33 on the basis of the identified pressure correspondence value to cut the cutting object 20 using the cutting blade 16 mounted on the mounting portion 32. The cutting device 1 can use the pressure changing member 31 to divert an impact temporarily imparted to the cutting blade 16 by unevenness or the like of the cutting object 20 during the execution of the cutting processing. The pressure changing member 31 of the present embodiment is the torsion spring, and thus, space required for a pressure changing member is relatively small.

The control portion 2 sets, as the cutting position, the position at which the mounting portion 32 has been moved to the platen 3 in the third direction from the contact position acquired by the processing at step S4 by the predetermined distance that is smaller than the thickness of the holding member 10 (step S5). Thus, the cutting device 1 can form a cut penetrating the cutting object 20 using the cutting blade 16, and can more reliably cut the cutting object 20 in accordance with the cutting data.

While the cutting object 20 is being cut in accordance with the cutting data, the control portion 2 determines whether the position output by the detector 41 is the separated position that is further in the fourth direction than the contact position (step S32, step S33). When the position output by the detector 41 is the separated position, the control portion 2 once more cuts the cutting object 20 using the cutting blade 16, on the basis of the acquired cutting data (yes at step S18, step S19, and step S15). As a result, the cutting device 1 detects that the cutting blade 16 has not reached the holding member 10, and once more performs the cutting. Thus, the cutting object 20 can be more reliably cut in accordance with the cutting data. The cutting device 1 can suppress line segments that have partially not been cut from remaining in the cutting object 20.

The control portion 2 of the present embodiment determines, for each of the cutting line segments, whether the position output by the detector 41 is the separated position that is further in the fourth direction than the contact position (step S32, step S33). The control portion 2 performs the cutting processing relating to the re-cutting line segment, which is the line segment for which the control portion 2 determines that there is a section for which the position output by the detector 41 is the separated position (yes at step S18, step S19, and step S15). The cutting device 1 can detect the re-cutting line segment at which the cutting blade 16 has not reached the holding member 10, and can reliably cut the re-cutting line segment. The cutting device 1 can suppress the line segments that have partially not been cut from remaining in the cutting object 20. The cutting device 1 once more cuts only a part of the pattern E that includes the re-cutting line segment, and thus, in comparison to a case in which the entire pattern E is once more cut, the processing to perform the re-cutting can be completed in a shorter time.

After controlling the conveyance mechanism 7 and the head movement mechanism 8 in accordance with the cutting data to relatively move the mounting portion 32 to the cutting start position for the re-cutting line segment, the control portion 2 controls the up-down drive mechanism 33 to move the mounting portion 32 in the third direction to the cutting position, and performs the cutting processing relating to the re-cutting line segment (step S8, step S9, step S14, and step S15). Thus, for the cutting processing relating to the re-cutting line segment, the cutting device 1 can relatively move the platen 3 and the mounting portion 32 to the cutting position while taking into account cuts already formed by the cutting processing the previous time. The cutting device 1 can identify the pressure correspondence value that is appropriate for performing the cutting processing relating to the re-cutting line segment, and can perform the cutting processing once more.

When, at the cutting start position, the mounting portion 32 cannot be moved in the third direction to the cutting position even when the pressure is applied to the mounting portion 32 by the pressure changing member 31 (no at step S10, and yes at step S21), after moving the mounting portion 32 in the third direction by a distance over which the mounting portion 32 can be moved, the control portion 2 repeats the cutting processing the plurality of times (step S20, step S14, step S15, yes at step S16). The cutting device 1 can cut the cutting object 20 by repeating the cutting processing the plurality of times, while taking into account the pressure of the cutting blade 16 applied to the cutting object 20 due to conditions such as the thickness and the hardness of the cutting object 20. The cutting device 1 can identify the pressure correspondence value suitable for performing the cutting processing for each time the cutting processing is performed the plurality of times, and can perform the cutting processing.

In the specific case, when, at the cutting start position, the mounting portion 32 cannot be moved in the third direction to the cutting position even when the pressure is applied to the mounting portion 32 by the pressure changing member 31, the control portion 2 cancels the execution of the cutting processing (no at step S24). When the execution of the cutting processing has been canceled, the control portion 2 issues a warning (step S25). The cutting device 1 can automatically cancel the cutting processing while taking into account a case in which the cutting blade 16 does not pierces the cutting object 20 as a result of the conditions such as the thickness and the hardness of the cutting object 20. The cutting device 1 can notify the user that the cutting processing has been canceled.

The control portion 2 cancels the execution of the cutting processing on the basis of a change amount in the position detected by the detector 41 corresponding to the pressure correspondence value applied to the cutting blade 16 (yes at step S21, step S23, no at step S24). The cutting device 1 can perform the determination as to whether to cancel the execution of the cutting processing without applying an excessive load to the cutting blade 16.

The control portion 2 adjusts the orientation of the cutting blade 16 by cutting the holding member 10 at the predetermined position (step S6). The control portion 2 performs the processing to acquire the contact position (step S4) during the period (from step S3 to step S7) in which the processing to adjust the orientation of the cutting blade 16 is performed. In comparison to a case in which the processing to adjust the orientation of the cutting blade 16 and the processing to acquire the contact position are performed separately, the cutting device 1 can shorten the overall time of the main processing.

The cutting device of the present disclosure is not limited to the above-described embodiment, and various changes may be added insofar as they do not depart from the spirit and scope of the present disclosure. For example, the configuration of the cutting device 1 may be changed as appropriate. In addition to the cutting by the cutting blade 16, the cutting device 1 may be capable of performing processing other than the cutting, such as drawing or the like. In the cutting device 1, it is sufficient that the mounting portion 32 and the holding member 10 be able to move relative to each other in the first direction and the second direction, and the mounting portion 32 may be able to move in the first direction and the second direction while the position of the holding member 10 is fixed, for example. The first direction, the second direction, the third direction, and the fourth direction may be changed as appropriate. It is sufficient that the holding member 10 be able to hold the cutting object 20, and, other than the mat-shaped member, may be a tray-shaped member or the like. It is sufficient that the detector 41 be able to detect the position of the mounting portion 32 in the third direction, and the arrangement, the configuration and the like of the detector 41 may be changed as appropriate. The detector may be an encoder that detects a movement amount of a slit provided in the mounting portion 32, or may be a sensor that detects a size and direction of a magnetic field (a magnetic flux) generated by a magnet provided on the mounting portion 32. A reference for the position of the mounting portion 32 in the third direction output by the detector 41 may be changed as appropriate. The pressure changing member 31 may be omitted as necessary. When the cutting device is provided with the pressure changing member, it is sufficient that the pressure changing member be able to change the pressure applied to the mounting portion toward the side of the platen, and the pressure changing member may be a member other than the torsion spring. The pressure changing member may be an air cylinder that applies a force in the third direction to the mounting portion 32, for example.

In place of the control portion 2, the main processing shown in FIG. 5 may be performed using a microcomputer, application specific integrated circuits (ASICs), a field programmable gate array (FPGA) or the like as a processor. The cutting processing may be performed in a distributed manner using a plurality of processors. The flash memory 74 that stores the program to execute the cutting processing may be configured by another non-transitory storage medium, such as an HDD and/or an SSD. It is sufficient that the non-transitory storage medium be capable of storing information, regardless of the period of storing the information. The non-transitory storage medium need not necessarily include a temporary storage medium (a transmitted signal, for example). The program to execute the main processing may be downloaded from a server connected to a network not shown in the drawings (in other words, may be transmitted as transmission signals), for example, and may be stored in an HDD. In this case, it is sufficient that the program be stored in a non-transitory storage medium, such as an HDD or the like provided in the server. With respect to each of the steps of the main processing of the above-described embodiment, the order of the steps may be changed, a step may be omitted, or a step may be added, as necessary. A case in which an operating system (OS) or the like that operates on the cutting device 1 on the basis of commands from the control portion 2 of the cutting device 1 performs part or all of the actual processing, and the functions of the above-described embodiment are realized by that processing is included in the scope of the present disclosure.

The predetermined position at step S2 may be changed as appropriate. The predetermined position at step S2 is preferably a location at which the cutting object 20 is not placed, and specifically, is preferably a region other than the cutting region surrounded by the border 11. When the cutting device 1 can identify the location at which the cutting object 20 is placed, the cutting device 1 may determine the predetermined position at step S2 on the basis of the identified arrangement of the cutting object 20. In this case, the predetermined position at step S2 may be inside the cutting region. The processing to acquire the cutting position may be performed at a separate timing from the processing to adjust the orientation of the cutting blade from step S3 to step S7. The processing at step S6 may be omitted as necessary.

The pressure correspondence value may be changed as appropriate. The pressure correspondence value may be, for example, the gradient calculated by the processing at step S12 or at step S24. For example, when a pressure sensor is provided on the mounting portion 32 or the cutting blade 16, a pressure sensor value may be used as the pressure correspondence value. The threshold values at step S13, step S21, and step S24 may be changed as appropriate in accordance with the reference expressing the position of the mounting portion 32 in the third direction, with the pressure correspondence value, and the like. The control portion 2 may omit the processing at step S14 as appropriate. The method for setting the cutting position may be changed as appropriate. The control portion 2 may change the method of setting the cutting position with respect to the contact position, in accordance with a type of the holding member. For example, the control portion 2 may set the contact position as the cutting position. However, when using the holding member 10 that has the uniform thickness, as in the present embodiment, the cutting position is the position that is the same as the contact position or that is further in the third direction than the contact position. When the thickness of the cutting region is different from that of other regions, the cutting position may be set while taking into account the differences in the thickness. The processing at step S32, step S33, step S18, and step S19 may be omitted or may be changed as appropriate. The processing at step S21, step S23, step S24, step S25, step S20, and step S16 may be omitted or may be changed as appropriate.

When the re-cutting line segment is present (yes at step S18), the control portion 2 may perform the cutting processing to cut the whole pattern represented by the cutting data, without identifying the re-cutting line segment. The control portion 2 may identify a location that is the separated position for a narrower range than the line segment (a part of the line segment), and may perform the cutting processing relating to the identified location. When performing the cutting processing the plurality of times, the control portion 2 need not necessarily identify the pressure correspondence value each time of performing the cutting processing. In this case, as the pressure correspondence value when performing the cutting processing, for example, the pressure correspondence value identified the first time may be used as it is, or a value set in accordance with at least one of the pressure correspondence value identified the first time and the separated position may be used, or a value that is set in advance may be used.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A cutting device comprising:

a platen;

a blade mount;

a cutting blade mounted on the blade mount;

first movement mechanisms, one of the first movement mechanisms having a first motor configured to move a holder placed on the platen and the blade mount relative to each other in a first direction, another of the first movement mechanisms having a second motor configured to move the holder placed on the platen and the blade mount relative to each other in a second direction intersecting the first direction;

a second movement mechanism having a third motor, the third motor being configured to move the blade mount in a third direction causing the blade mount to approach the platen and a fourth direction causing the blade mount to separate from the platen, the third and fourth directions being directions intersecting the first and second directions, the fourth direction being an opposite direction of the third direction;

a detector configured to output a position of the blade mount in the third direction;

a processor configured to control the first movement mechanisms and the second movement mechanism; and a memory storing computer-readable instructions that, when executed by the processor, instruct the processor to perform processes comprising:

acquiring cutting data;

controlling the first movement mechanisms in accordance with the cutting data to move the blade mount and the holder relative to each other to a cutting start position at which the blade mount faces a cutting object held by the holder;

acquiring a contact position of the blade mount in the third direction output by the detector when the cutting blade comes into contact with the holder;

setting a cutting position in the third direction based on the contact position, the cutting position being a position at which an edge of the cutting blade in the third direction is located further in the third direction than the cutting object;

with the blade mount and the holder located relative to each other at the cutting start position, controlling the second movement mechanism to move the blade mount in the third direction to the cutting position;

performing cutting processing to cut the cutting object using the cutting blade by controlling the first movement mechanisms in accordance with the cutting data;

determining, during a period in which the cutting object is being cut on the basis of the cutting data, whether the position output by the detector is a separated position at which the edge of the cutting blade is separate from the holder, the separated position being further in the fourth direction than the contact position; and when the position output by the detector is the separated position, re-cutting the cutting object using the cutting blade, on the basis of the cutting data.

2. The cutting device according to claim 1, wherein the re-cutting of the cutting object includes, when the position output by the detector is the separated position, re-cutting a whole pattern represented by the cutting data using the cutting blade.

3. The cutting device according to claim 1, wherein the re-cutting of the cutting object includes, when the position output by the detector is the separated position, re-cutting a part of a whole pattern represented by the cutting data using the cutting blade, the part of the whole pattern including the position output by the detector.

4. A cutting device comprising:

a platen;

a blade mount;

a cutting blade mounted on the blade mount;

first movement mechanisms, one of the first movement mechanisms having a first motor configured to move a holder placed on the platen and the blade mount relative to each other in a first direction, another of the first movement mechanisms having a second motor configured to move the holder placed on the platen and the blade mount relative to each other in a second direction intersecting the first direction;

a second movement mechanism having a third motor, the third motor being configured to move the blade mount in a third direction causing the blade mount to approach the platen and in a fourth direction causing the blade mount to separate from the platen, the third and fourth directions being directions intersecting the first and second directions, the fourth direction being an opposite direction of the third direction;

a detector configured to output a position of the blade mount in the third direction;

a processor configured to control the first movement mechanisms and the second movement mechanism; and a memory storing computer-readable instructions that, when executed by the processor, instruct the processor to perform processes comprising:

acquiring cutting data, the cutting data representing cutting line segments;

controlling the first movement mechanisms in accordance with the cutting data to move the blade mount and the holder relative to each other to a cutting start position at which the blade mount faces a cutting object held by the holder;

acquiring a contact position of the blade mount in the third direction output by the detector when the cutting blade comes into contact with the holder;

setting a cutting position in the third direction based on the contact position, the cutting position being a position at which an edge of the cutting blade in the third direction is located further in the third direction than the cutting object;

with the blade mount and the holder located relative to each other at the cutting start position, controlling the second movement mechanism-to move the blade mount in the third direction to the cutting position;

performing cutting processing to cut the cutting object using the cutting blade by controlling the first movement mechanisms in accordance with the cutting data;

determining, during a period in which the cutting object is being cut on the basis of the cutting data, whether the position output by the detector is a separated position at which the edge of the cutting blade is separate from the holder, the separated position being further in the fourth direction than the contact position, for each of the cutting line segments represented by the cutting data; and performing the cutting processing relating to a re-cutting line segment, wherein the re-cutting line segment is one of the cutting line segments determined to have a position for which the position output by the detector is the separated position.

5. The cutting device according to claim 4, wherein the performing the cutting processing relating to the re-cutting line segment includes, after controlling the first movement mechanisms in accordance with the cutting data and relatively moving the blade mount to a cutting start position of the re-cutting line segment, controlling the second movement mechanism, moving the blade mount in the third direction to the cutting position, and performing the cutting processing relating to the re-cutting line segment.

6. The cutting device according to claim 4, wherein the performing of the cutting processing relating to the re-cutting line segment includes re-cutting a part of the re-cutting line segment.

* * * * *